(12) United States Patent
Mallela et al.

(10) Patent No.: US 10,931,391 B2
(45) Date of Patent: Feb. 23, 2021

(54) ONE-STEP TIME STAMPING OF SYNCHRONIZATION PACKETS FOR NETWORKED DEVICES

(71) Applicant: Intel Corporation, Santa Clara, CA (US)

(72) Inventors: Sita Rama Chandrasekhar Mallela, Tanjung Bungah (MY); Mark Bordogna, Andover, MA (US)

(73) Assignee: Intel Corporation, Santa Clara, CA (US)

( * ) Notice: Subject to any disclaimer, the term of this patent is extended or adjusted under 35 U.S.C. 154(b) by 635 days.

(21) Appl. No.: 15/717,649

(22) Filed: Sep. 27, 2017

(65) Prior Publication Data
US 2019/0097745 A1    Mar. 28, 2019

(51) Int. Cl.
*H04J 3/06* (2006.01)
*H04L 29/06* (2006.01)

(52) U.S. Cl.
CPC ......... *H04J 3/0667* (2013.01); *H04L 69/28* (2013.01)

(58) Field of Classification Search
None
See application file for complete search history.

(56) References Cited

U.S. PATENT DOCUMENTS

| | | | |
|---|---|---|---|
| 9,071,554 B2* | 6/2015 | Bui | H04L 47/622 |
| 9,288,002 B2* | 3/2016 | Sergeev | H04J 3/0658 |
| 9,642,133 B2* | 5/2017 | Shibuta | H04W 72/0446 |
| 2015/0163154 A1* | 6/2015 | Chaloupka | H04L 69/28 370/503 |

OTHER PUBLICATIONS

Arnold, Douglas, "One-step or Two-step?", https://blog.meinbergglobal.com/2013/10/28/onesteptwostep/, published on Oct. 28, 2013, accessed on Apr. 25, 2017, pp. 1-8.

* cited by examiner

*Primary Examiner* — Hong S Cho
(74) *Attorney, Agent, or Firm* — Fletcher Yoder, P.C.

(57) ABSTRACT

Electronic devices coupled to a network may exchange messages containing time-of-day information synchronization of the internal clocks. The information exchanged may include the instant at which a message leaves the electronic device. Discussed herein are methods and systems that allow 1-step timestamping of messages containing time-of-day information. The 1-step timestamping methods and systems may reduce the impact of non-deterministic time delays in the transmit path (e.g., encryption, expansion, inclusion of tags), and may improve the accuracy of the time-of-day information of the packets. For example, systems and methods may allow accurate 1-step timestamping of IEEE 1588 Precision Time Protocol packets with the uncertainty of delays from MACSec encryption or other security mechanisms. Some embodiments employ estimation non-deterministic delay of previously transmitted packets to estimate the state of the transmit path. Some embodiments include communication channels to allow circuitry in transmit path to report the state.

20 Claims, 5 Drawing Sheets

ONE-STEP TIME STAMPING OF SYNCHRONIZATION PACKETS FOR NETWORKED DEVICES

BACKGROUND OF THE DISCLOSURE

This disclosure relates generally to electronic devices that may couple to networks, and more specifically, to methods and systems for synchronization of clocks in devices coupled through a network.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices are coupled to each other through a network connection. The electronic devices may have internal clocks that may be used to provide time-of-day information for certain operations that the electronic devices may carry out, such as transmitting network signals from one electronic device to another. As such, certain situations may benefit from a synchronization of the internal clocks of the multiple devices coupled through the network. This may be accomplished by an exchange of messages that include information of the time-of-day provided by the internal clocks. However, in certain network connections and/or protocols, the latency for the messages distributed (e.g., the time of transit for a packet between sender and receiver) may have some uncertainty. For example, in the IEEE 802.3 Ethernet protocol, the latency of a packet between a sender and a receiver can vary widely. Synchronization in such systems may be performed, for example, by employing more sophisticated protocols and strategies such as the IEEE 1588 Precision Time Protocol (PTP). Such strategies may include estimation of the latency for a particular packet based on time stamps of outgoing packets.

To decrease security vulnerabilities, certain networks may include cryptography or other packet processing specifications. For example, under the IEEE 802.1AE MACsec protocol, outgoing packets may be encrypted by a device sending the packet, and decrypted by a device receiving the packet. The packets associated with time synchronization protocols such as the IEEE 1588 PTP may also be encrypted and decrypted under the MACsec protocol. This encryption may create challenges in the implementation of the PTP protocol, since the latency in the encryption process may be uncertain, reducing the accuracy of the timestamps used in the synchronization process. To recover the accuracy of the PTP protocol, a two-step time stamping process may be used. In such system, an initial synchronization message is sent without the timestamp, and a follow-up message containing the timestamp of the synchronization message is sent. This solution, however, may require more resources from the electronic devices and use more network bandwidth, as it may employ as many as twice the number of messages.

BRIEF DESCRIPTION OF THE DRAWINGS

Advantages of the disclosure may become apparent upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many systems may include multiple electronic devices coupled via a network. These devices may share or distribute data and/or tasks to achieve an overall improved performance. To coordinate their operations, these systems may communicate by exchanging messages (e.g., packets) through the network. These packets may obey specifications of the network, as described by network protocols. For certain applications, it may be useful to synchronize the internal clocks of the devices across a network. To that end, devices may exchange packets containing timestamps, which may be the time-of-day at which a packet was sent and/or received by a device according to a clock of that device. The exchange of these timestamped packets may facilitate an estimation of the latency of these packets and, ultimately, be used to synchronize clocks in situations where the packet latency may vary widely.

To prevent delays in the transmit path of the devices from interfering with the synchronization strategies, timestamping should take place at the moment of transmission of the packet. However, in certain situations, such as when the packets are encrypted prior to transmission, the processing of the outgoing packet may add non-deterministic delays.

These delays may prevent the timestamp incorporated in a synchronization packet from being accurate. In such conditions, the initial synchronization packet may be sent without any timestamp information, and the timestamp of the synchronization packet may be sent in a follow-up message. This 2-step process may increase the resources employed by the synchronization protocol. Embodiments described herein include methods and circuitry that allow accurate 1-step timestamping methods, which may be used in time synchronization protocols. In such systems, the initial synchronization may include an accurate timestamp and, therefore, may not require a follow-up message. Certain embodiments may include state-based systems that mitigate the effect of non-deterministic latencies in the transmit path. Other embodiments may include methods for the outgoing circuitry to identify and avoid situations in which the latencies in packet processing circuitry may be non-deterministic. Certain embodiments may, for example, employ a two-port protocol to wait for the packet processing circuitry to be idle prior to timestamping.

Figure 1:
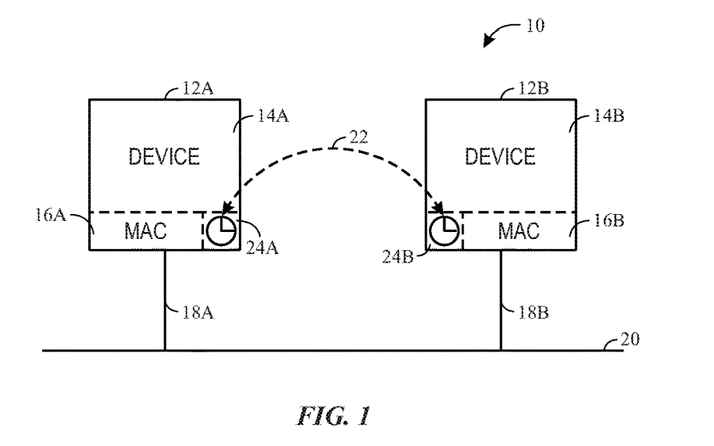
FIG. 1 illustrates a diagram of a network that couples two electronic devices which may implement the circuitry and/or methods for time synchronization described herein, in accordance with an embodiment.

With the foregoing in mind, FIG. 1 illustrates, by way of example, a system 10 that include two electronic devices 12A and 12B. Examples of the type of electronic devices found in some implementations include but are not limited to a general purpose computer, a System-on-Chip, a network router, a switch or relay, a hardware controller, a sensor, a programmable logic device such as a field programmable gate array (FPGA), or the like. Devices 12A and 12B may, respectively, include data utilization circuitries 14A and 14B, which may include processors, memory devices, user interface elements, sensors, actuators, and any other elements that allow the electronic devices 12A to operate. Devices 12A and 12B may also include, respectively, network circuitries 16A and 16B, which may be include circuitry that allows the access to the network medium (e.g., Media Access Control). Device 12A may be coupled to the shared channel 20 of the network via a physical connection 18A, which may be an optic fiber, an electric wire and/or a wireless (radio-frequency) connection. Device 12B may also exchange packets with device 12A by accessing the shared channel 20 using physical connection 18B. As discussed briefly, the devices 12A and 12B may also include clocks 24A and 24B, respectively, which may provide time information (e.g., time-of-day) to the data utilization circuitries 14A and/or 14B. The electronic devices 12A and/or 12B may include circuitry corresponding to a Programmable Logic Device (PLD) or a Field Programmable Gate Array (FPGA), a computer, or application-specific hardware, such as an application-specific integrated circuit (ASIC).

In some applications, a synchronization 22 between clocks 24A and 24B may be desired for proper function of electronic devices 12A and 12B. Since the communication delays (e.g., latencies) in a packet travelling from network circuitry 16A and 16B may be uncertain, techniques to measure and/or estimate that delay may be employed in the calculation of the offset between the time-of-day values in clocks 24A and 24B.

Figure 2A:
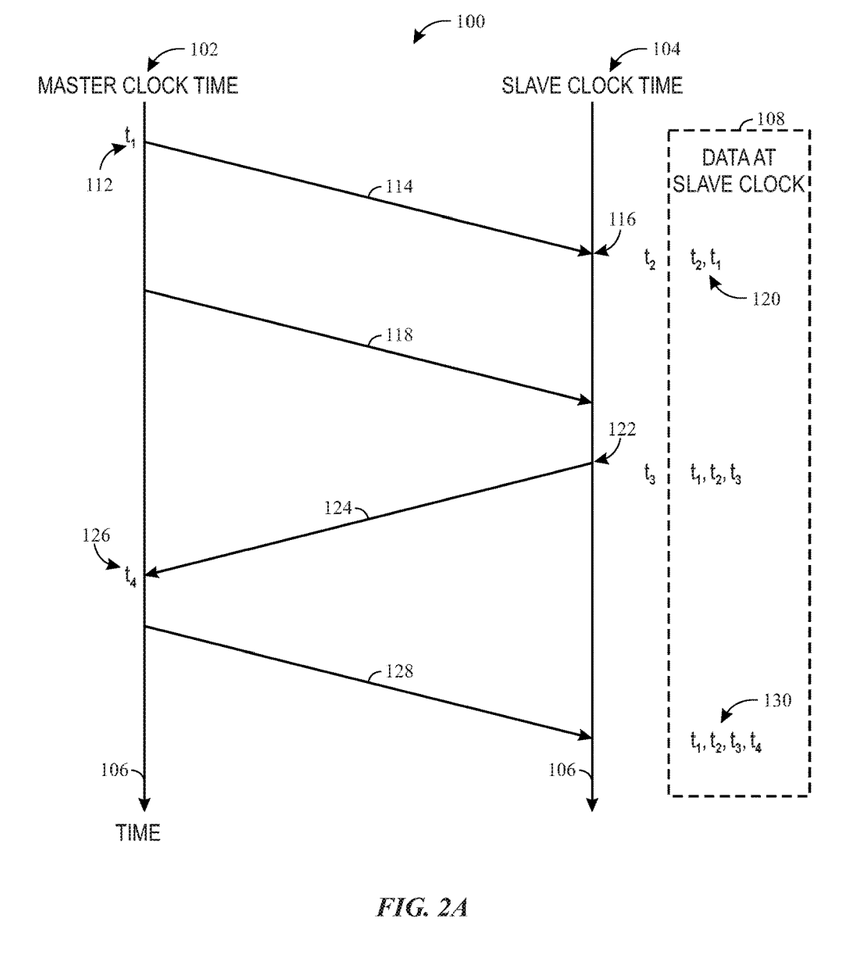
FIG. 2A provides a time sequence for a 2-step timestamping method that may be implemented with and methods circuitry described herein, in accordance with an embodiment FIG. 2B provides a time sequence for a 1-step timestamping method that may be implemented with and methods circuitry described herein, in accordance with an embodiment.

A precision time protocol (PTP) defined in the IEEE 1588 protocol specifies a method for such synchronization between electronic devices in a network. Although this disclosure describes time-synchronization according to the IEEE 1588 protocol by way of example, it should be appreciated that the modular architecture of this disclosure may employ any suitable time-synchronization protocol, and is not limited to the IEEE 1588 protocol. A sequence diagram 100 implementing a two-step timestamping process for the IEEE 1588 protocol is illustrated in FIG. 2A. In accordance with the protocol, a master clock 102 communicates with a slave clock by sending a "sync" message 114 at time $t_1$ 112 to the slave clock 104. The slave clock 104 receives the "sync" message and records its timestamp $t_2$ 42 corresponding to its time-of-day. The master clock 102 may also send a "follow up" message 118 carrying the timestamp $t_1$ 112 of the master clock 102 time-of-day when the "sync" message 114. The content of the "follow up" message 118, timestamp $t_1$, is stored (120) in a memory 108 of the slave clock 104 along with the timestamp $t_2$ after the reception of the "follow up" message 118. Further, at any time, the slave clock 104 may send a delay request 124 to the master clock 102, and may store the corresponding timestamp $t_3$ 122 in memory 108. In response to delay request 124, the master clock 102 may send a "delay response" 128 to the slave clock 104, which stores (130) the content, timestamp $t_4$ 126 in memory 108. The four stored timestamps (130) may allow the slave clock 104 to calculate the offset between the master and the slave clocks and synchronize the clock accordingly, through the formula $o=(t_2-t_1+t_3-t_4)/2$.

Figure 2B:
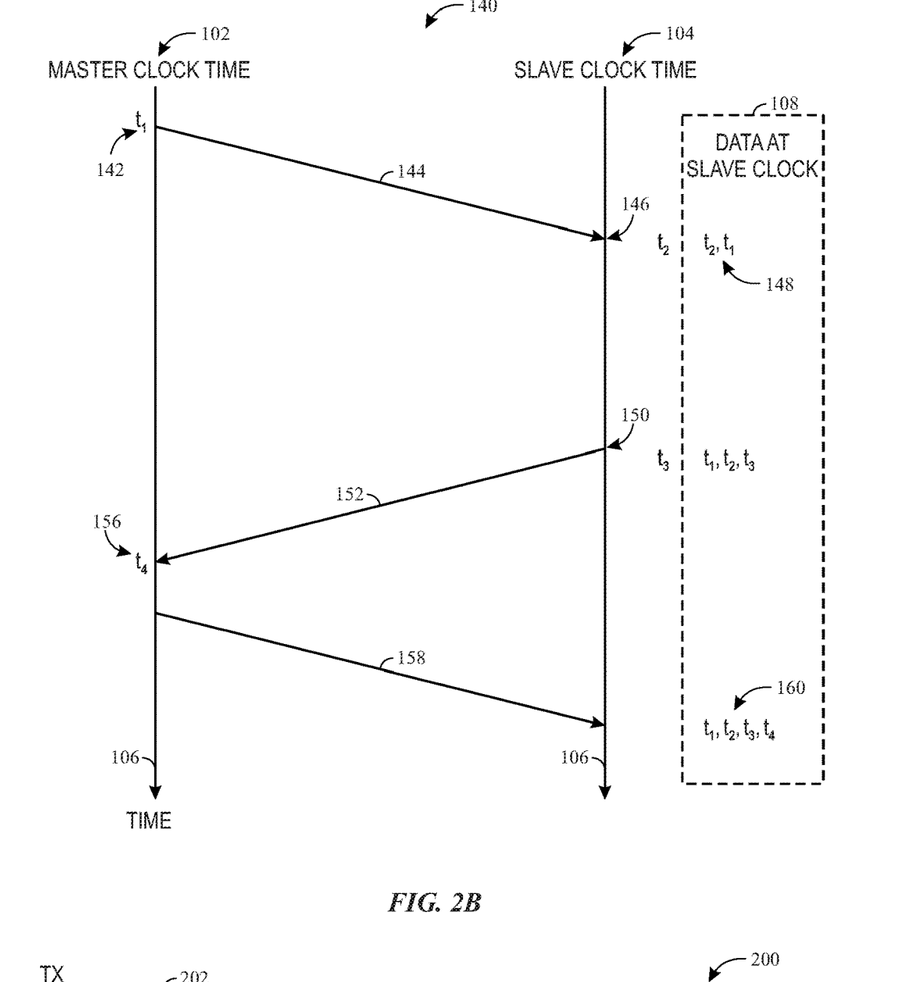

As discussed above, the follow-up message may be used to improve the accuracy of synchronization in situations where the delay between the assembly of the "sync" message 114 and the actual transmission of the "sync" message 114 is uncertain. In these situations, the outgoing interface may identify the time-of-day $t_1$ 112 of actual transmission, and only then assemble the "follow-up" message 118. may not be able to carry an accurate timestamp $t_1$ 112. The sequence diagram 140 illustrated in FIG. 2B illustrates the operation of a 1-step timestamping protocol. In this system, the "sync" message 144 sent by master clock 102 already includes the timestamp $t_1$ 142. Slave clock 104 may also generate timestamp $t_2$ 146 at the time of the arrival of "sync" message 144. In this system, the memory 108 may have time stamps $t_1$ and $t_2$ stored (148) in without a "follow-up" message. The delay request process may be similar to the sequence diagram 100. The slave clock 104 may send a delay request 152 to the master clock 102, and may store the corresponding timestamp $t_3$ 150 in memory 108. In response to delay request 152, the master clock 102 may send a "delay response" 158 to the slave clock 104, which stores (160) the content, timestamp $t_4$ 126 in memory 108. The four stored timestamps (160) may allow the slave clock 104 to calculate the offset between the master and the slave clocks and synchronize the clock accordingly, through the formula $o=(t_2-t_1+t_3-t_4)/2$.

Figure 3:
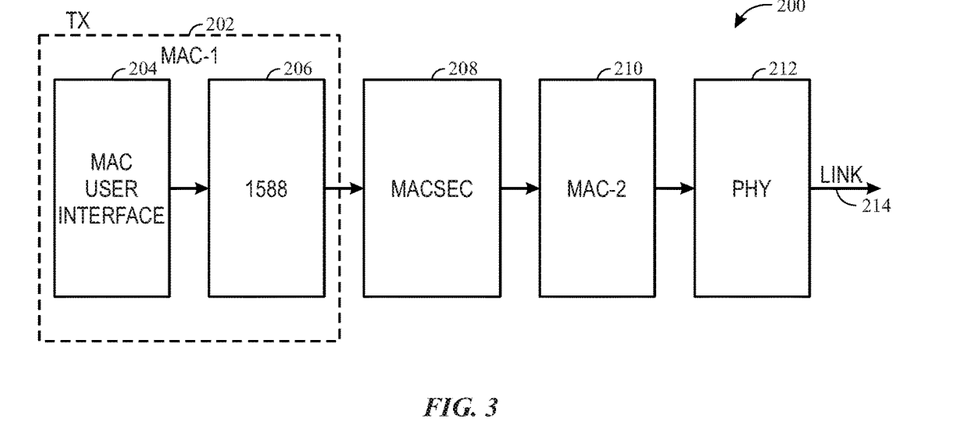
FIG. 3 illustrates circuitry that may be used to process outgoing time synchronization packets, and may implement 1-step time stamping method using a state-based method, in accordance with an embodiment.

The accuracy of timing synchronization employing the 1-step timestamping may be affected by uncertainty in the latency of downstream processing. The diagram in FIG. 3 illustrates a transmit path 200 that may be employed to prevent uncertainty in the latency from affecting the accuracy of the timestamp produced with the 1-step timestamping process. Transmit path 200 may have transmission circuitry 202 that includes a user interface for the media access control (MAC) layer 204. The MAC user interface 204 may generate a packet to be sent over a network based on information received from the data utilization circuitry. Transmission circuitry 202 may also include time synchronization circuitry 206, which may be coupled to the internal clock of the electronic device. Time synchronization circuitry 206 may be able to generate synchronization packets, such as "sync" messages, "follow-up" messages, "delay request" messages and "delay response" messages, among others. Time synchronization circuitry 206 may also extract time-of-day information from the clock of the electronic device, perform offset calculations, and/or update the clock of the electronic device based on calculated offsets. Furthermore, time synchronization circuitry 206 may also operate a state-based method that estimates an appropriate inter-packet gap (IPG) that provides a deterministic latency, as further detailed below, and corrects the outgoing time stamp based on the estimated latency.

Packets produced by transmission circuitry 202 may be processed by a processing circuitry, such as MACsec circuitry 208. The MACsec circuitry 208 may encrypt the outgoing packet received by the transmission circuitry 202. Processing by the MACsec circuitry 208 may also involve inclusion of a SEC tag, in accordance with the MACsec protocol. The processed (e.g., encrypted) packet produced by MACsec circuitry 208 is forwarded to a second MAC circuitry 210 that may add additional tags in accordance with the MAC protocol. Physical layer (PHY) circuitry 212 receives the packet from the second MAC circuitry 210 and transmits it to the physical channel 214.

Latency in MACsec circuitry 208 and in the second MAC circuitry 210 may have a combination of a deterministic component, and a non-deterministic component. The deterministic component of the latency may correspond to the time for encryption and addition of tags by the MACsec circuitry 208 and/or the second MAC circuitry 210. The non-deterministic component of the latency may be associated to delays that may occur due to some uncertainty in the MACsec circuitry 208. For example, insertion of bytes resulting from encryption may generate backpressure in the pipeline, which may delay processing of a trailing packet. Similarly, padding of packets to conform to standard lengths used by MACsec circuitry 208 may also generate this backpressure. In general, such backpressures may occur when the increase in the processing time is larger than the gap between the current packet and the previous packet (the inter-packet gap, or IPG). This may result in a processing overload (e.g., the pipeline becomes shorter than the number of bytes being processed), which stalls the data flow in MACsec circuitry 208 Due to the variation in the size of the MAC packets provide by transmission circuitry 202, the amount of backpressure may vary substantially, resulting in a large non-deterministic latency. To prevent the interference of this non-deterministic latency, the transmission circuitry 202 may include circuitry that holds the packet (e.g., buffer circuitry) and delays the timestamping process by time synchronization circuitry 206 until the present backpressure is alleviated. This process may be performed by estimating the state of the MACsec circuitry 208 based on knowledge of previously sent packets and the operation of the MACsec circuitry 208.

Figure 4:
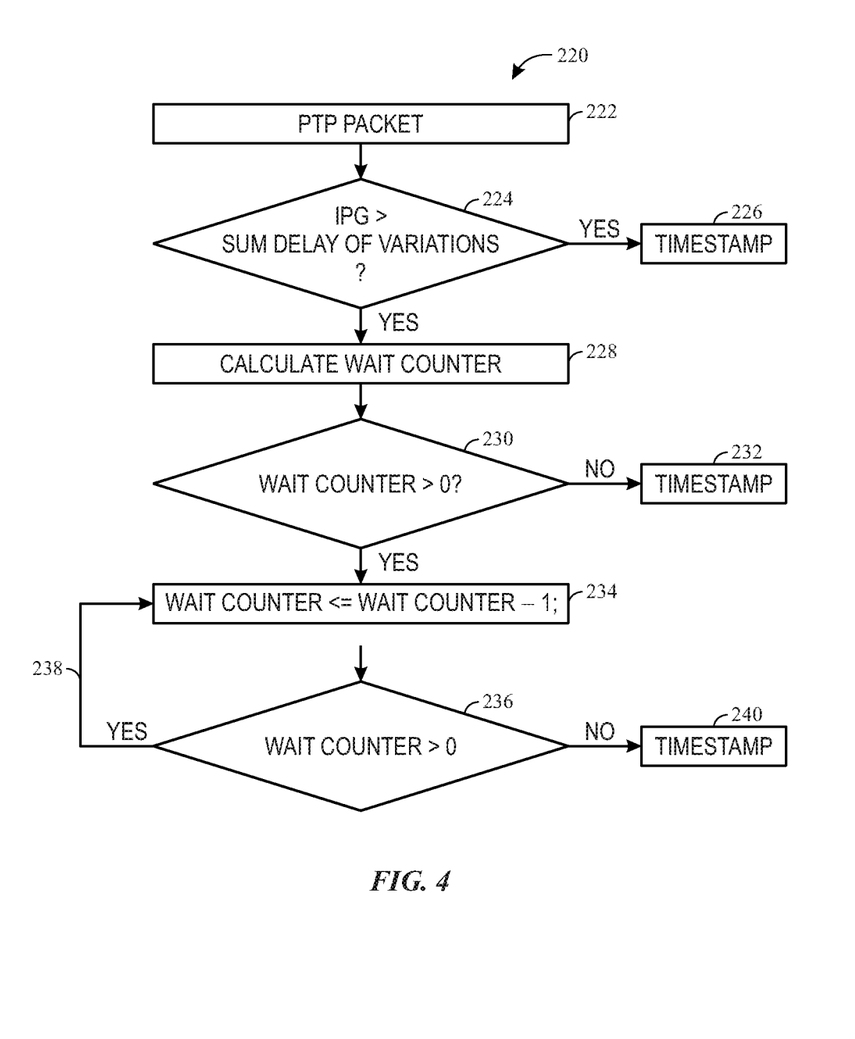
FIG. 4 illustrates a method to implement a 1-step time stamping method using a state-based method, in accordance with an embodiment.

The method 220 illustrated in FIG. 4 illustrates a strategy that may be employed by the transmission circuitry 202 of FIG. 3 to estimate the appropriate timestamping strategy. This method may be implemented as a series of instructions stored in a memory and performed by a processor. This method may also be implemented in programmable logic circuitry and/or hardened logic circuitry. A precision time protocol (PTP) packet may be generated in a process 222. As discussed above, the packet may incorporate a timestamp that carries the time-of-day of a clock associated to the electronic device. To that end, the PTP packet may be timestamped and forwarded to the MACsec circuitry, as discussed above. The present IPG (i.e., the time since the last packet was forwarded from the transmission circuitry 202 to the MACsec circuitry 208) may be compared to a maximum of the non-deterministic latency, which may be a sum of all possible delay variations that may occur in MACsec circuitry 208 (process 224). This sum may be identified based on a knowledge of the operations of MACsec circuitry 208. For example, the sum of delay variations may include delays from worst-case scenarios, such as the largest number of bytes that may be inserted for padding or for insertion due to cryptography.

If the present IPG is larger than the sum of all possible delay variations, the PTP packet may be timestamped and forwarded (process 226). If, however, the present IPG is smaller than that sum, transmission circuitry may calculate an initial value for a wait counter (process 228). The initial value set in the wait counter may provide an estimate of how long the packet should wait in the transmission circuitry 202 prior to timestamping to prevent non-deterministic delays. The wait counter may include an estimate of the based on the difference between delays from previous packet expansions, additional byte insertions, and/or other non-deterministic delays, and the present IPG. The wait counter may also be scaled by a width of the bus of the downstream system. Further delays specific to the implementation of the MACsec block may also be incorporated in the initial wait counter. In some implementations, the initial wait counter value may be WAIT COUNTER=BLOCK SPECIFIC DELAYS+
(PREVIOUS PACKET EXPANSION+ADDI-
TIONAL BYTE INSERTION−INTER PACKET
GAP)/BUS WIDTH.

After initialization of the wait counter, transmission circuitry 202 may verify if the wait counter is positive (process 230). Note that the initial value of the wait counter determined in process 228 may be different from the sum of the delay of all variations used in process 224. Therefore, if wait counter in process 230 is smaller than or equal to zero, the transmission circuitry 202 may timestamp the PTP packet being held and forward it to the MACsec circuitry 208. If the wait counter in process 230 is larger than zero, then transmission circuitry 202 may start enter a countdown loop 238 that includes a decrement process 234 and a verification process 236. In decrement process 234, the value in the wait counter may be reduced by one. In the verification process 236, the value stored in the wait counter is compared to zero. If in process 236 the wait counter is smaller than or equal to zero (e.g., the counter expires), the transmission circuitry 202 may timestamp the PTP packet being held and forward it to the MACsec circuitry 208. If the wait counter is larger than zero in process 236, the system may remain in the countdown loop 238 for another iteration. As a result of countdown loop 238, the transmission circuitry 202 holds the outgoing PTP packet for the period initialized in process 228 before forwarding it to the MACsec circuitry 208.

Transmit path 200 and method 220 illustrated in FIGS. 3 and 4 respectively may allow the outgoing PTP packets to avoid non-deterministic latencies in the outgoing pipeline by estimating the non-deterministic latency of the previously transmitted packet and holding the packet for that duration. For example, in a situation where the system is providing back-to-back PTP packets, the timestamping of each packet may be held by the transmission circuitry 202 as determined by a wait counter. As a result, only one packet is presented at a time to the MACsec circuitry 208, resulting in a deterministic latency. Similarly, if back-to-back packets (PTP and non-PTP packets) with minimum IPG are transmitted, the wait counter may incorporate non-variable delays from tag insertions, block expansions, padding into the wait counter. Since timestamping only takes place after the time counter is run, the delays suffered after timestamping may be deterministic. Note that in some implementations, method 220 may be modified such that the wait counter in process 228 is initialized with the sum of all possible delays as in process 224, instead of determined based on an estimate of the non-deterministic delay. Moreover, it should be noted that the timestamp incorporated into the outgoing PTP packet may be determined by adding to the time-of-day provided by the associated clock the deterministic latencies provided by MACsec circuitry 208, second MAC circuitry 210, and PHY circuitry 212, such that the timestamp represents the time at which the PTP packet enters the physical channel 214.

The method 220 described above may use information about internal delays in the MACsec to be known. In certain situations, the MACsec circuitry 208 delays may not be known. For example, the designer of MACsec circuitry 208 may decide to hide the algorithms that determine the number of bytes incorporated in the packet from the designer of the transmission circuitry 202 for security reasons. In such situations, the determination of the sum of all delays and/or of the wait counter may not be possible. As illustrated by transmit path 250 in FIG. 5, a 1-step timestamping process may be implemented with an addition of a communication channel between the MACsec circuitry 208 and the transmission circuitry 202. Transmit path 250 may have transmission circuitry 202 that includes a MAC user interface 204 and time synchronization circuitry 206. Similarly to transmit path 200, packets may be forwarded to the MACsec circuitry 208, which may encrypt the outgoing packet. The processed packet may be transmitted to a second MAC circuitry 210 and send to the physical channel 214 by PHY circuitry 212. As discussed above, the non-deterministic latencies that follow the timestamping of PTP packet may be removed by holding the PTP packet in the transmission circuitry 202 until the MACsec circuitry 208 has finished processing the previous packet. A communication protocol that employs notify port 252 and accept port 254 may be used to allow the transmission circuitry 202 to identify when the MACsec circuitry 208 is ready to receive the next packet.

Figure 5:
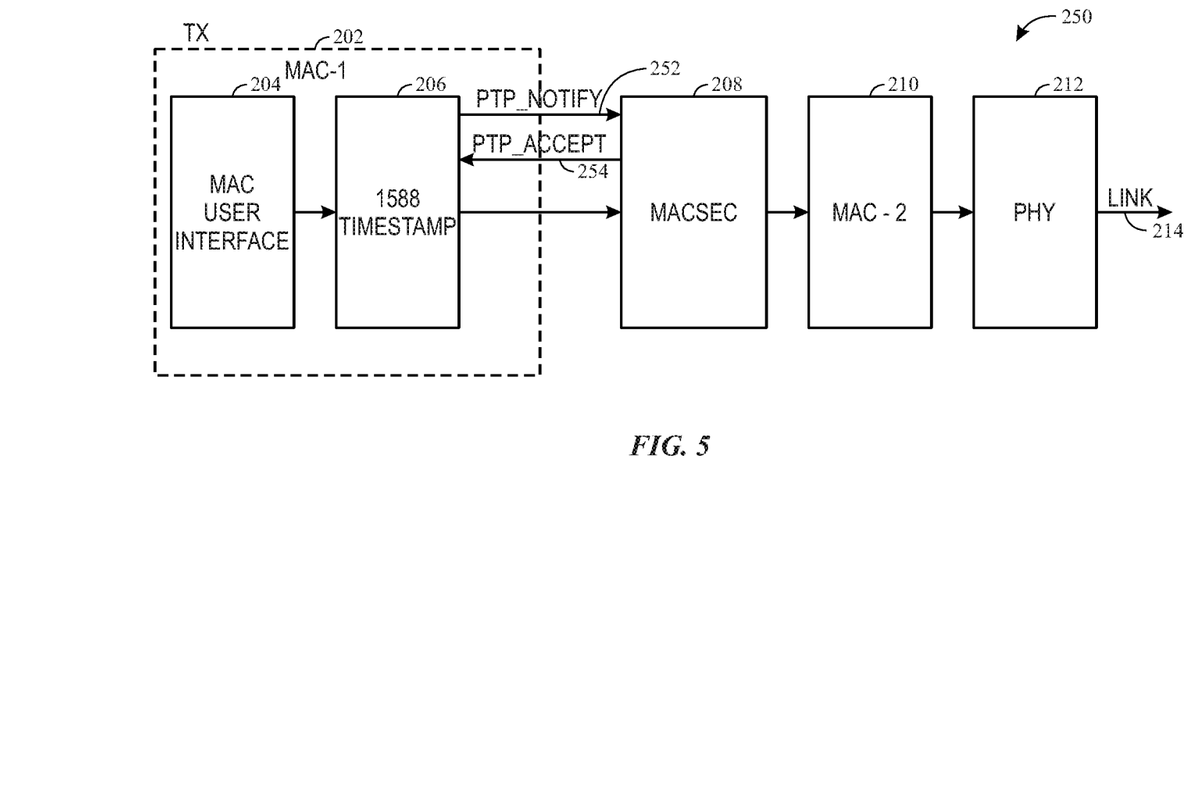
FIG. 5 illustrates circuitry that may be used to process outgoing time synchronization packets and may implement 1-step time stamping method using a two-port protocol, in accordance with an embodiment.

The use of the communication protocol for communication between the MACsec circuitry 208 and the transmission circuitry 202 may allow a modular design and incorporation of the MACsec circuitry 208 in the transmit path 250. For example, the transmission circuitry 202 may be designed without knowledge of details of the downstream MACsec circuitry 208, facilitating the design process. Moreover, the time synchronization protocol including the 1-step timestamping process may be used with MACsec cores from multiple vendors may, without requirement of the disclosure of internal details of the MACsec by the vendors. Note that the incorporation of the communication protocol may increase the latency of the transmit path, due to the clock cycles required to send and/or receive the notify and the accept messages, as discussed below.

Figure 6:
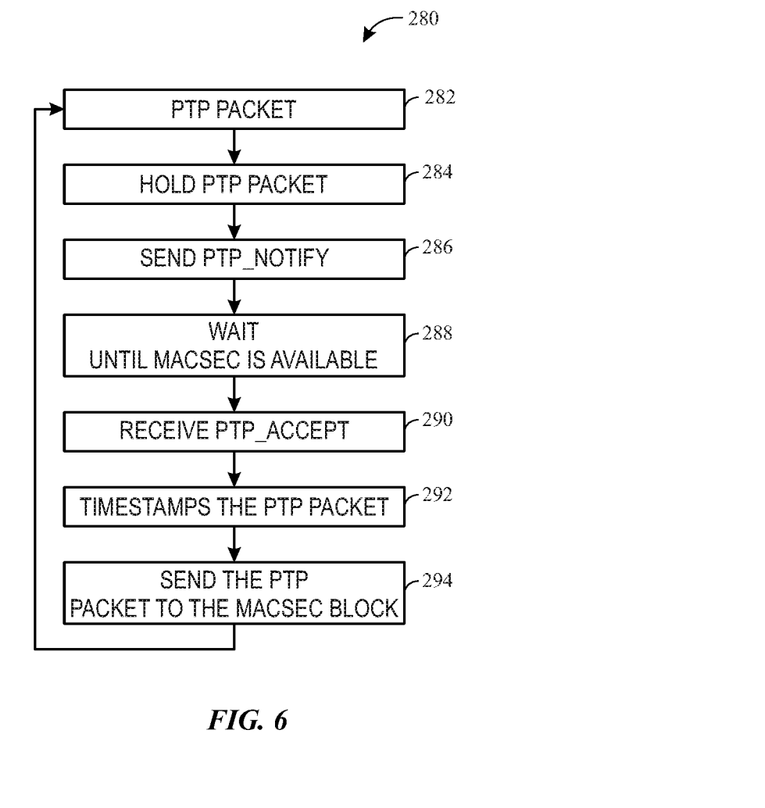
FIG. 6 illustrates a method to implement a 1-step time stamping method using a two-port protocol, in accordance with an embodiment.

Method 280 of FIG. 6 illustrates a method for employing a communication channel to hold the PTP packet. After receiving the PTP packet (process 282), transmission circuitry 202 may hold the packet (process 284) and send a notify message to the MACsec circuitry 208 (process 286). The notification may take place by asserting (e.g., setting a logical value or a voltage) the notify port 252. Transmission circuitry 202 may then wait until the MACsec circuitry 208 is available to receive the PTP packet (process 288). Transmission circuitry 202 receives an accept message (process 290) once the MACsec circuitry 208 determines that it can provide a deterministic delay for a timestamped PTP packet. The accept message may be sent by MACsec circuitry by asserting the accept port 254. Upon receiving the accept message, transmission circuitry may timestamp the PTP packet (process 292) and forward it to the MACsec block (process 294). Note that the time synchronization circuitry 206 may incorporate to the timestamp the calculated deterministic latency of the MACsec block, as discussed above. While the above example discusses a communication channel that includes two ports 252 and 254, the method may employ a single communication line which may be asserted by the transmission circuitry 202 to transmit a notify message and/or a deasserted by the MACsec circuitry 208 to transmit an accept message. Other communication methods that allow communication between MACsec circuitry 208 and transmission circuitry 202 may be adapted to provide the deterministic latency following timestamping.

Systems and methods described above may allow 1-step timestamping methods for time synchronization protocols, such as the IEEE 1588 PTP protocol. The circuitry and the transmit paths described herein may be scalable to provide MAC throughputs ranging from 10 Mbps to more than 100 Gbps. The methods allow for high accuracy timestamps that are incorporated in a 1-step operation due to the substantial reduction of the non-deterministic delays. Timestamp accuracy may be as small as 1 clock cycle, which may be in sub nanosecond range, based on the clock frequency of the transmit path. Furthermore, the 1-step operation may substantially decrease the amount of bandwidth used by the IEEE 1588 packets by decreasing the number of messages sent and increasing the speed of convergence between the clocks of the various electronic devices attached to the network. The methods and systems described above may be adapted to be used with protocols other than the IEEE 802.3 Ethernet protocol, or with other data pipelines where data may be held until a non-deterministic latency can be ensured. Furthermore, while the examples illustrate MACsec processing, the systems and methods may be adapted to other packet processing that may include non-deterministic delays.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device configured to couple to a network, the electronic device comprising:
    network circuitry comprising a transmit path that comprises:
    transmission circuitry that comprises timestamping circuitry configured to add a timestamp to an outgoing packet;
    packet processing circuitry configured to receive an outgoing packet from the transmission circuitry and produce a processed outgoing packet; and
    physical layer circuitry configured to receive the processed outgoing packet from the packet processing circuitry and transmit the processed outgoing packet to a physical channel;
    wherein the transmission circuitry is configured to hold the outgoing packet until the transmission circuitry determines that the packet processing circuitry provides a deterministic latency for the packet.

2. The electronic device of claim 1, wherein the packet processing circuitry implements a MACsec protocol.

3. The electronic device of claim 1, wherein the outgoing packet comprises an IEEE 1588 packet for time synchronization between the electronic device and a second electronic device coupled to the network.

4. The electronic device of claim 1, wherein the network circuitry comprises instructions for an Ethernet protocol.

5. The electronic device of claim 1, wherein the transmission circuitry determines that the packet processing circuitry provides the deterministic latency by comparing an inter-packet gap (IPG) between the outgoing packet and a previous outgoing packet with a maximum non-deterministic latency of the packet processing circuitry.

6. The electronic device of claim 5, wherein the maximum non-deterministic latency of the packet processing circuitry comprises byte insertion delays, or packet expansion delays, or both.

7. The electronic device of claim 1, comprising a communication channel between the transmission circuitry and the packet processing circuitry, wherein the transmission circuitry sends a notify message through the communication channel to the packet processing circuitry upon receiving the outgoing packet, and wherein the packet processing circuitry sends an accept message through the communication channel to the transmission circuitry upon determining that the packet processing circuitry can provide deterministic latency.

8. The electronic device of claim 7, wherein the communication channel comprises a two-port protocol.

9. A method to transmit a time synchronization packet from an electronic device, the method comprising:
   receiving the time synchronization packet in transmission circuitry;
   comparing a present inter-packet gap (IPG) with a maximum non-deterministic latency of a packet processing circuitry, wherein the present IPG comprises the time between the synchronization packet and a previous packet transmitted by the transmission circuitry to the packet processing circuitry;
   timestamping the time synchronization packet and forwarding the timestamped synchronization packet to the packet processing circuitry when the present IPG is greater than the maximum non-deterministic latency of the packet processing circuitry;
   initializing a wait counter when the present IPG is smaller than the maximum non-deterministic latency of the packet processing circuitry; and
   timestamping the time synchronization packet and forwarding the timestamped synchronization packet to the packet processing circuitry upon expiration of the wait counter.

10. The method of claim 9, wherein initializing the wait counter comprises setting the wait counter to a difference between the maximum non-deterministic latency of the packet processing circuitry and the present IPG.

11. The method of claim 9, wherein initializing the wait counter comprises setting the wait counter to a difference between an estimate of a non-deterministic delay of the previous packet transmitted by the transmission circuitry to the packet processing circuitry and the present IPG.

12. The method of claim 9, wherein timestamping the time synchronization packet comprises receiving a time-of-day from a clock of the electronic device, adding a deterministic delay to the time-of-day to obtain a timestamp, and incorporating the timestamp to the synchronization packet.

13. The method of claim 9, wherein the packet processing circuitry comprises encrypting circuitry.

14. The method of claim 9, wherein the time synchronization packet comprises an IEEE 1588 packet.

15. A method to transmit a time synchronization packet from an electronic device, the method comprising:
    receiving the time synchronization packet in transmission circuitry;
    sending a notify message from the transmission circuitry to a packet processing circuitry upon receiving the time synchronization packet;
    receiving an accept message in the transmission circuitry from the packet processing circuitry; and
    timestamping the time synchronization packet and sending the timestamped synchronization packet to the packet processing circuitry upon receiving the accept message from the packet processing circuitry.

16. The method of claim 15, wherein the transmission circuitry and the packet processing circuitry are coupled through a first port that is configured to transport the notify message and a second port that is configured to transport the accept message.

17. The method of claim 15, comprising:
    periodically determining, by the packet processing circuitry, if the packet processing circuitry can provide a deterministic latency to a received time synchronization packet upon receiving the notify message; and
    sending the accept message upon determining that the packet processing circuitry can provide the deterministic latency.

18. The method of claim 17, wherein the packet processing circuitry determines that it can provide a deterministic latency by measuring a backpressure in a data pipeline of the packet processing circuitry.

19. The method of claim 15, wherein the packet processing circuitry comprises an encrypting circuitry.

20. The method of claim 15, wherein the time synchronization packet comprises an IEEE 1588 packet.

* * * * *